(12) United States Patent
Napolez et al.

(10) Patent No.: US 7,819,087 B2
(45) Date of Patent: Oct. 26, 2010

(54) REMOTE CONTROLLED ANIMAL TRAINING SYSTEM WITH WIRELESS COMMUNICATION SYSTEM

(75) Inventors: Francisco J. Napolez, Tucson, AZ (US); Timothy J. Crist, Tucson, AZ (US)

(73) Assignee: Tri-Tronics, Inc., Tucson, AZ (US)

( * ) Notice: Subject to any disclaimer, the term of this patent is extended or adjusted under 35 U.S.C. 154(b) by 622 days.

(21) Appl. No.: 11/835,412

(22) Filed: Aug. 7, 2007

(65) Prior Publication Data
US 2008/0035073 A1    Feb. 14, 2008

Related U.S. Application Data

(60) Provisional application No. 60/821,919, filed on Aug. 9, 2006.

(51) Int. Cl.
*A01K 29/00* (2006.01)
(52) U.S. Cl. .................................... 119/721
(58) Field of Classification Search ............ 119/712, 119/718–721; 340/573.1–573.3
See application file for complete search history.

(56) References Cited

U.S. PATENT DOCUMENTS

| | | | |
|---|---|---|---|
| 4,802,482 A | 2/1989 | Gonda et al. | 119/29 |
| 5,054,428 A | 10/1991 | Farkus | 119/29 |
| 5,471,954 A | 12/1995 | Gonda et al. | 119/859 |
| 5,666,908 A | 9/1997 | So | 119/720 |
| 6,003,474 A * | 12/1999 | Slater et al. | 119/859 |
| 6,170,439 B1 * | 1/2001 | Duncan et al. | 119/720 |
| 6,598,563 B2 * | 7/2003 | Kim et al. | 119/720 |
| 6,860,240 B2 * | 3/2005 | Kim et al. | 119/719 |
| 7,005,985 B1 * | 2/2006 | Steeves | 340/572.1 |
| 7,385,513 B2 * | 6/2008 | Everest et al. | 340/573.1 |

* cited by examiner

*Primary Examiner*—Thomas Price
(74) *Attorney, Agent, or Firm*—Hayes Soloway P.C.

(57) ABSTRACT

A remote controlled animal training system includes a wireless transmitter capable of transmitting a plurality of wireless signals non-concurrently. Each wireless signal of the plurality of signals is representative of one of a plurality of predetermined stimulus levels. A wireless receiver is capable of receiving the wireless signal from the transmitter. A demodulator is in communication with the RF receiver, demodulating the wireless signal to produce a digital signal. A microprocessor is in communication with the demodulator for receiving the digital signal from the demodulator and producing a pulse signal therefrom. A first output device is in communication with the microprocessor. The first output device produces a stimulus of intensity relative to a characteristic of the pulse signal.

23 Claims, 11 Drawing Sheets

REMOTE CONTROLLED ANIMAL TRAINING SYSTEM WITH WIRELESS COMMUNICATION SYSTEM

CROSS-REFERENCE TO RELATED APPLICATION

This application claims priority to copending U.S. Provisional Application Ser. No. 60/821,919, filed Aug. 9, 2006, which is entirely incorporated herein by reference.

FIELD OF THE INVENTION

The present invention is generally related to wireless devices in the area of animal husbandry, and more particularly is related to a system for reliable remote control of animal training stimulus signals.

BACKGROUND OF THE INVENTION

Figure 1:
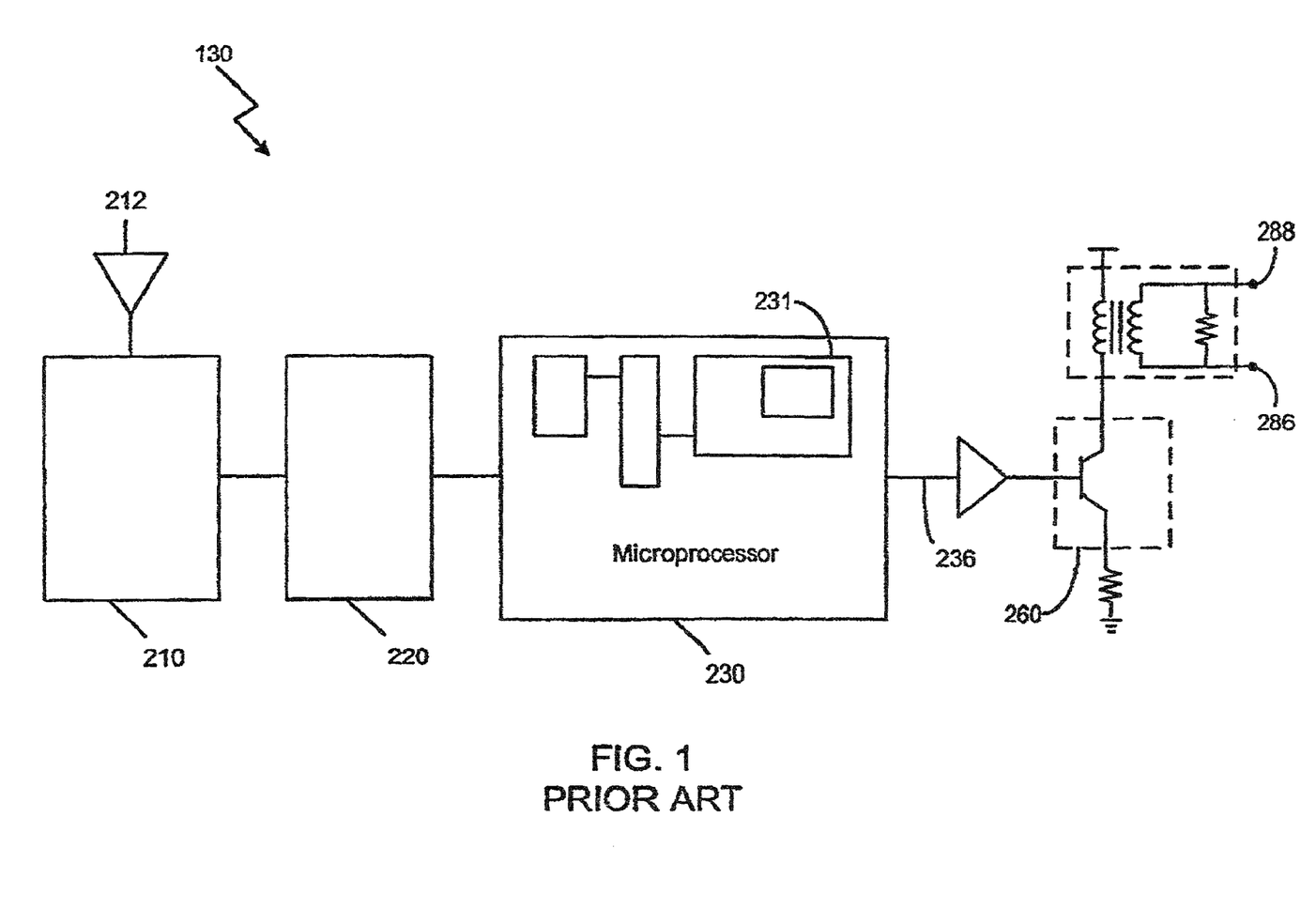
FIG. 1 is a block diagram of a remote animal training system, in accordance with a prior art device.

FIG. 1 is a block diagram of a remote animal training system, in accordance with a prior art device. More specifically, FIG. 1 is an edited copy of FIG. 2A, from U.S. Pat. No. 5,666,908, disclosing a receiver unit 130 having an antenna 212. The antenna 212 receives an RF signal containing a code representing one of a number of possible levels of stimulation selectable on a remote transmitter (not shown). The RF signal is detected and demodulated by receiver 210 and a "detector" or demodulator 220. The demodulated code is serially input to microprocessor 230 and stored in memory 231 thereof. Microprocessor 230 executes a program to produce output pulses at node 236. The pulse widths of such output pulses (described in the '908 patent and incorporated herein by reference) correspond precisely to one of the possible stimulus levels represented by the stored code. The width of each pulse determines how long the transformer primary winding switch transistor 260 is turned on in response to each output pulse and, thereby, determines the peak-to-peak magnitude of the resulting pulse produced between electrodes 286 and 288 when transistor 260 is turned off at the end of the pulse. The greater the pulse width, the more energy is stored in the core material of the transformer, and the higher the peak-to-peak Flyback or stimulus voltage is between electrodes 286 and 288 immediately after transistor 260 is turned off at the end of each pulse.

To properly train an animal, the trainer must carefully manage the intensity of stimulus being provided to the animal. Inconsistent stimulus levels received by the animal often cause confusion to the animal, which interferes with the training process. A basic requirement of a remote training device of the general type including stimulus intensity controllable by a remote transmitter is that each remotely selected intensity level must reliably and consistently apply the same electrical stimulus level to the animal being trained. If this requirement is not met, the trainer will be unable to control the consistency of stimulus levels.

A shortcoming of most prior art remote training systems such as described in U.S. Pat. No. 5,666,908 having remotely selectable control of the amplitude of the stimulus signal between the skin-contacting electrodes is that for the lower values of the intensity settings, the open circuit and/or the "loaded" electrode voltages applied between the contacting electrodes may not be high enough to cause effective electrical contact of the electrodes with the animals' skin. Thus, the animal may not feel and therefore may not respond to the intended stimulus for lower selected intensity control settings. A trainer observing the lack of response then is likely to increase the selected stimulus level on the remote transmitter until the animal responds. At that point, the stimulus level actually felt by the animal may suddenly be much higher than is justified by its behavior and may cause confusion or fright of the animal, which is counterproductive.

The foregoing problems may be caused by a combination of the dryness of the animals' skin, the tightness of the collar pressing the electrodes against the animals' skin, and various other conditions that cause or contribute to ineffective electrical contact of the electrodes with the animals' skin. The only known reliable way of nevertheless ensuring electrical contact of the electrodes to the animals' skin is to ensure that the open circuit output voltage produced by the secondary winding of the output transformer in the receiver is high enough to arc across any gap or insulative barrier between the electrodes and the animals' skin.

Commonly assigned U.S. Pat. No. 4,802,482, to Gerald J. Gonda and Gregory J. Farkas, issued Feb. 7, 1989, incorporated herein by reference, and commonly assigned U.S. Pat. No. 5,054,428, to Gregory J. Farkas, issued Oct. 8, 1991, also incorporated herein by reference, disclose prior remote animal training systems in which intensity of electrical stimulus is remotely controlled by causing the receiver circuits to produce various stimulus waveforms of constant amplitude and selectable duration and/or frequency. The high open circuit stimulus voltage needed is achieved independently of the intensity level selected. The devices disclosed in these patents provide reliable electrical contact of the electrodes to the skin of the animal being trained by providing sufficiently high open circuit voltages to ensure that even low levels of stimulation produced by controlling the output pulse widths and repetition rates are reliably felt by the animal. However, it has been discovered that even though the circuitry disclosed in the foregoing patents is capable of providing the stimulus voltage with a very wide range of selectable pulse widths and pulse frequencies, the physiology of the dogs being trained is such that the effective range of remotely selectable stimulus that can be achieved by adjusting only the pulse widths and repetition rates of the electrode pulses is much less than is desirable for a wide range of training conditions.

Therefore, it has been necessary for professional trainers and others to either manually swap pluggable intensity-level-setting resistors or manually swap resistive contact electrodes (e.g. of the type described in commonly assigned U.S. Pat. No. 5,471,954, issued Dec. 5, 1995) to provide the needed range of remotely controllable stimulus intensity.

Because of the lack of a wide range of nearly immediately selectable stimulus levels in the prior art remote training devices, professional trainers have had to plan particular training sessions so as to include only activities and circumstances likely to cause dog behaviors which would require stimulus levels within the range determined by the pluggable intensity-level-setting resistors and/or the resistive electrodes on the collar mounted receiver unit. Then, if unexpected behavior or unexpected circumstances occurred during the training session, the trainer often was not able to immediately select an effective stimulus level. In such a case, an opportunity for effective training was lost, and the training process may have been set back as a result of inconsistent and/or inappropriate stimulus.

It would be very desirable to be able to provide remotely controlled stimulus levels that can be promptly changed to any desired level within a very broad range so that a trainer can immediately provide stimulus levels appropriate to any dog behavior likely to occur in any environmental circumstance likely to occur during any training session.

Thus, there is an unmet need for an improved remote training device that reliably provides a very wide range of remotely adjustable, consistent intensity levels under a wide variety of different training conditions, with no need to manually modify or manually interchange intensity-setting components on the receiver unit. There also is an unmet need for a remote training device that (1) provides maximum selectability of the intensity of stimulus applied to the animal, and (2) also achieves very reliable, repeatable electrical contact of the electrodes with the animals' skin over the entire desired range of selectable stimulus intensity settings.

The receiver circuitry of some prior collar-mounted receivers for remote animal training systems has driven the output transformer into saturation. This has resulted in very non-linear, unpredictable amplitudes of the stimulus pulses produced by the secondary winding of the transformer.

SUMMARY OF THE INVENTION

Embodiments of the present invention provide a system and method for producing a wide range of stimulus intensities for training an animal using a remote transmitter and a collar-mounted receiver carried by the animal. Briefly described, in architecture, one embodiment of the system, among others, can be implemented as follows. The system includes an RF transmitter capable of transmitting a plurality of RF signal non-concurrently. Each RF signal of the plurality of RF signals is representative of one of a plurality of pre-determined stimulus levels. An RF receiver is capable of receiving the RF signal from the transmitter. A demodulator is in communication with the RF receiver, demodulating the RF signal to produce a digital signal. A microprocessor is in communication with the demodulator for receiving the digital signal from the demodulator and producing a pulse signal therefrom. A first output device is in communication with the microprocessor. The first output device produces a stimulus of intensity relative to a characteristic of the pulse signal.

The present invention can also be viewed as providing methods for producing a wide range of stimulus intensities for training an animal using a remote transmitter and a collar-mounted receiver carried by the animal. In this regard, one embodiment of such a method, among others, can be broadly summarized by the following steps: selecting one of a plurality of desired stimulus levels at the transmitter; transmitting an RF signal representative of the selected desired stimulus level to the receiver; demodulating the received RF signal in the receiver to produce a digital signal representative of the selected stimulus level and inputting the digital signal to a microprocessor in the receiver; operating the microprocessor to decode the digital signal to transmit a signal to a first output device; and providing the desired stimulus level from the first output device.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 2:
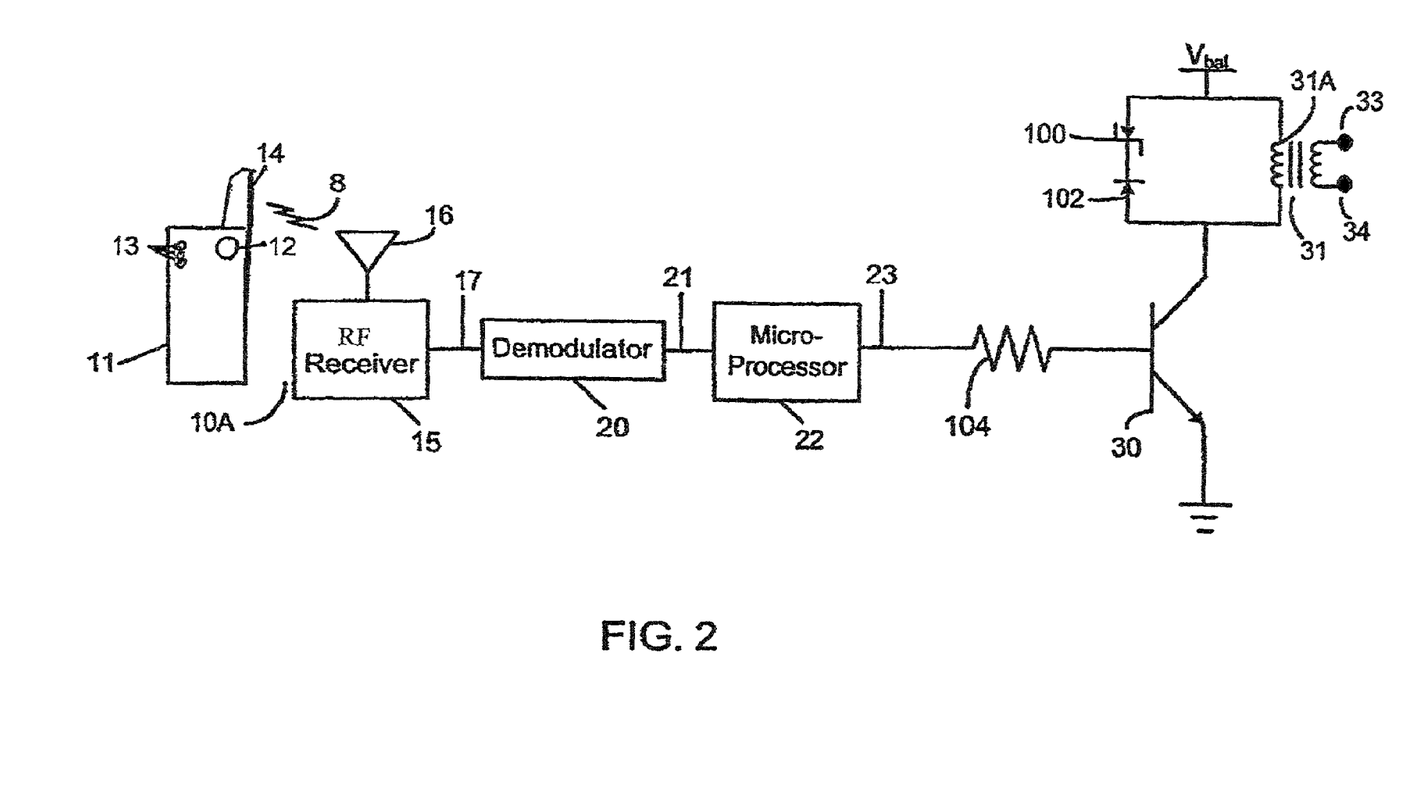
FIG. 2 is a block diagram of a remote animal training system, in accordance with a first exemplary embodiment of the present invention.

FIG. 2 is a block diagram of a remote animal training system 10A, in accordance with a first exemplary embodiment of the present invention. The remote training system 10A includes a remote transmitter 11 having several push-button switches 13 for setting a stimulus level code that selects one of, for example, three to six desired electrode stimulus signal levels. The stimulus level selected is digitally encoded into an RF signal 8. The RF signal 8 is transmitted by a remote antenna 14 on the remote transmitter 11 to a collar antenna 16 and detected by an RF receiver 15. The receiver output 17 of the RF receiver 15 is demodulated by a demodulator 20 to produce a digital output 21. The digital output 21 of the demodulator 20 represents the stimulus code/data selected by push-button switches 13 of remote transmitter 11. The digital output data 21 is translated by a microprocessor 22 into one of six or more possible stimulus level selection signals 23. The stimulus level selection signal 23 may be a pulse width signal having one or more pulses, each pulse having a substantially similar width. Intensity selector switch 12 provides six or more settings for selecting one of six or more available intensity levels. Switches 13 allow the user to select between several functions/types of stimulus such as momentary or continuous stimulation, e.g., strobe, sound, electric stimulation (shock), or vibrations, and low, medium and high stimulation by pressing one or more switches.

The stimulus signal 23 is applied through resistor 104 to a control electrode of a switch transistor 30 connected to a primary winding 31A of a Flyback transformer 31 and a diode 102 in series with a Zener or Transient Voltage Suppressor (TVS) diode 100. The Zener or TVS diode 100 may have a response time of less than 8 microseconds. The peak-to-peak voltage produced between a pair of electrodes 33 and 34 connected to the secondary winding terminals of the Flyback transformer 30 corresponds to the pulse width of the drive pulses at 23, and hence to the stimulus level selected by push-button switches 13 of the remote transmitter 11.

The operation of the Zener or TVS diode 100 with respect to voltage suppression will now be discussed in detail. In general, when a Flyback signal is produced on the primary winding 31A of the Flyback transformer 31, the Zener or TVS diode 100 suppresses the voltage on the primary side. For example, the maximum voltage peak needs to be approximately 50-65 Volts or less on the primary side of the Flyback transformer 31A for most training applications. The Flyback transformer-winding ratio for this exemplary design constraint is approximately 100:1. On the primary side, when a signal occurs at the collector of the transistor 30, the Zener or TVS diode 102 biases the primary winding 31A of the Flyback transformer 31 thereby allowing the Flyback transformer 31 to be energized to the proper level for signal delivery to a load and preventing minimal, if any, current flow through the Zener or TVS diode 100. When transistor 30 is switched "OFF", the Zener or TVS diode 100 charges, thereby delivering the "Flyback signal" across the transformer 31 at an acceptable voltage. The voltage suppression effectuated by the Zener diode 100 that occurs on the primary side corresponds to an open-circuit peak voltage suppression level, e.g., between 5000 Volts to 6000 Volts. Such voltage suppression prevents high voltage arcing inside the device on the circuit boards to other components that may be destroyed and cause the training device to malfunction and also produces a consistent ES level to the animal creating more effective training of the animal.

The Zener or TVS diode 100 may be a 43-51 volt unit, which would create a suppressed open-circuit (worst case) electro-stimulus in the range of 5000V peak to 6000V peak.

Figure 3:
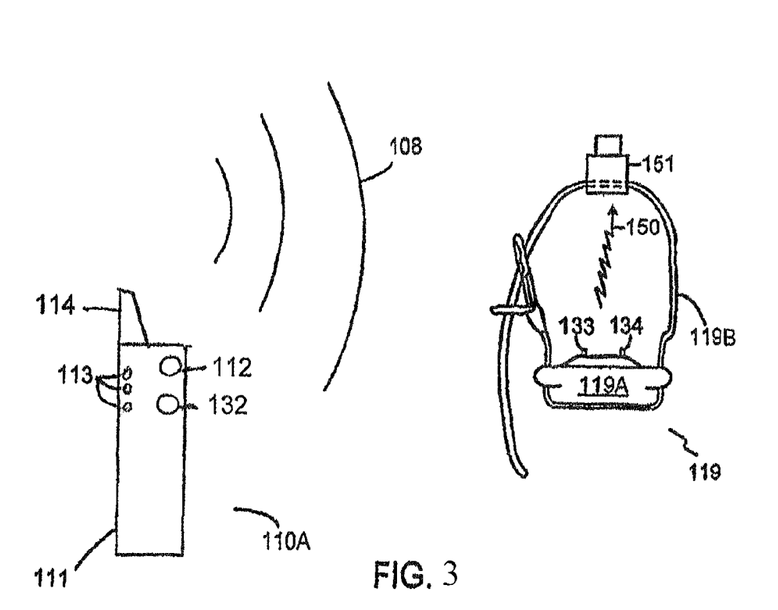
FIG. 3 is a front view of a remote animal training system, in accordance with a second exemplary embodiment of the present invention.

FIG. 3 is a front view of a remote animal training system 110A, in accordance with a second exemplary embodiment of the present invention. The remote animal training system 110A includes a remote transmitter 111 having several push-button switches 113 for setting a stimulus level code that selects one of, for example, three to six or more desired electrode stimulus signal levels. The stimulus level selected is digitally encoded into an RF signal 108. A remote antenna 114 on the remote transmitter 111 transmits the RF signal 108 to a collar-mounted receiver unit 119 carried by the animal. The receiver unit 119 includes an RF receiver and an (LF) magnetic coupling transmitter 119A attached to a bottom of a collar 119B. An accessory magnetic coupling receiver device 151 (e.g., a beeper, strobe light, or similar) may be attached to an upper portion of collar 119B. The receiver unit 119 may receive signals from the remote transmitter 111 corresponding to electric stimulus levels and a beeper selection. At least two electrodes 133 and 134 of the transceiver unit 119 electrically contact the skin of the animal and apply thereto stimulus signals the intensity of which is in accordance with the RF signal 108 sent from the remote transmitter 111.

A switch or a setting on an ISS knob 132 on the remote transmitter 111 may actuate the collar-mounted accessory device 151. Upon actuation of the switch or knob 132, the collar mounted accessory device 151 receives a signal from the LF transmitter in the RF receiver unit 119A to produce an audible and/or visual signal, e.g., a strobe that enables the trainer to audibly/visually determine if the animal is moving or is motionless, i.e., "pointing" or for purposes of locating. The signal transmitted from remote transmitter 111 to the RF receiver/LF transmitter 119A may be approximately 27 MHz (RF), for example, and the signal from the receiver/transmitter 119A to the collar-mounted accessory device 151 may be approximately 125 KHz (LF) for example.

The intensity selector switch 112 on the remote transmitter 111, which may be a rotary switch, may be used to select "zero" level or any one of, for example, six or more desired output levels of the pulses of stimulus voltage $V_o$ produced by the Flyback transformer 131. The several push button switches 113 can be depressed individually or in combination to select the frequency and number of the pulses of stimulus voltage signal $V_o$.

Figure 4:
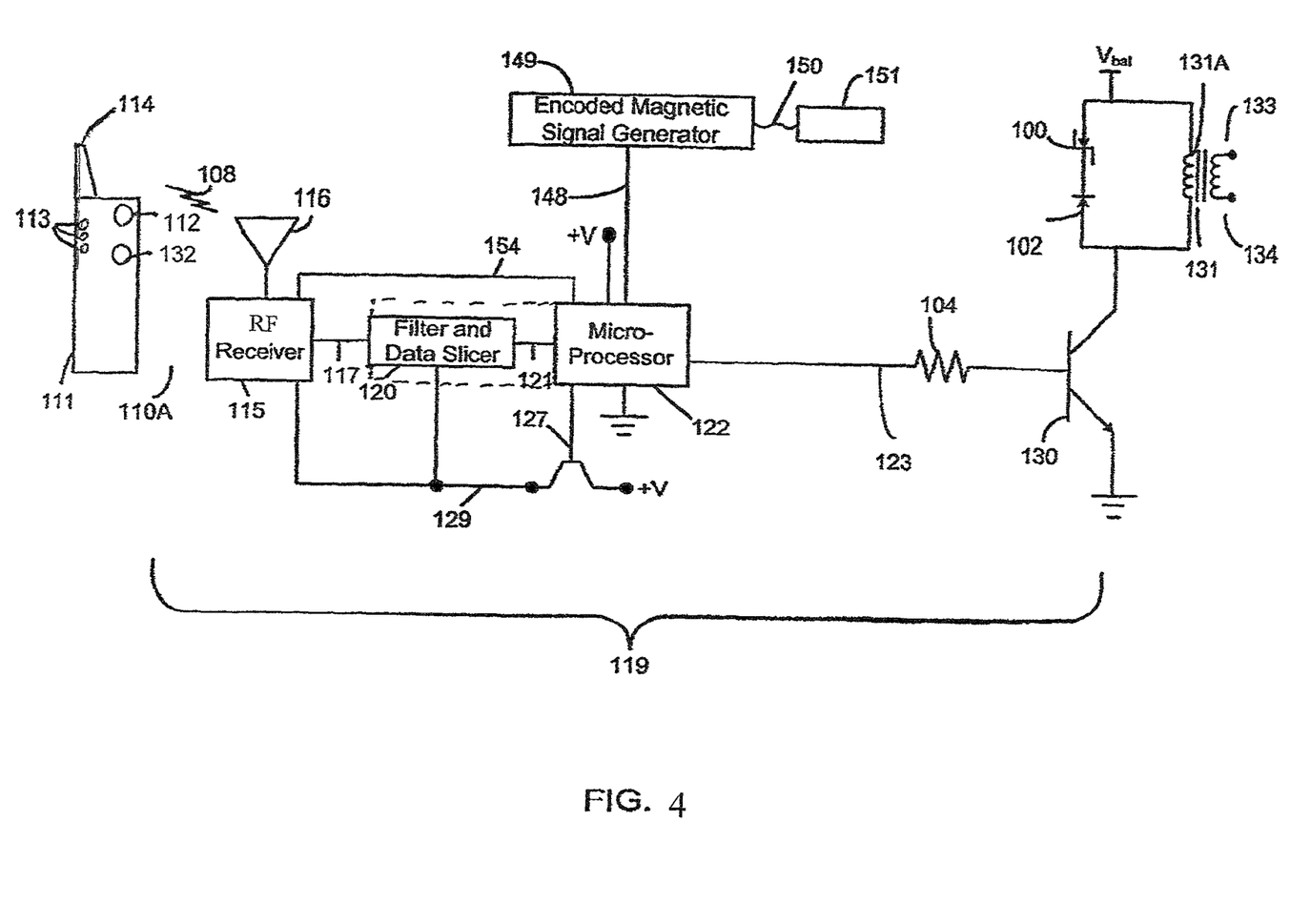
FIG. 4 is a block diagram of the remote animal training system of FIG. 3, in accordance with the second exemplary embodiment of the present invention.

FIG. 4 is a block diagram of the remote animal training system 110A of FIG. 3, in accordance with the second exemplary embodiment of the present invention. The remote training system 110A includes the remote transmitter 111 having several push-button switches 113 for setting a stimulus level code that selects one of the stimulus signal levels. The stimulus signal level selected is digitally encoded into an RF signal 108. The RF signal 108 is transmitted by a remote antenna 114 on the remote transmitter 111 to a collar antenna 116 and detected by an RF receiver 115. The collar antenna 116 and the RF receiver 115 are part of the collar-mounted receiver unit 119 carried by the animal.

The receiver output 117 of the RF receiver 115 is connected to the input of a filter and data slicer circuit 120 which may be separate or part of a microprocessor 122. An output signal of the filter and data slicer/comparator circuit 120 provides a digital output 121, a serial digital encoded signal that becomes a data input to the microprocessor 122. Filter and data slicer/comparator circuit 120 is a conventional circuit that filters and shapes the signals produced from the RF receiver 115 to generate the digital output 121 as an input to the microprocessor 122.

The microprocessor 122 supplies a stimulus level select signal 123 that includes a pulse width modulated stream of output pulses. Each of the output pulses in the stimulus level selection signal 123 for any one stimulus level selection have a substantially similar width, although pulse widths may differ between different stimulus level selections. The stimulus level selection signal 123, which includes pulse widths of which correspond to the stimulus levels selected by the intensity selector switch 112 of the remote transmitter 111.

The stimulus level selection signal 123 is applied through the resistor 104A to a control electrode of a switch transistor 130 connected to a primary winding 131A of a Flyback transformer 131 and a diode 102A in series with a Zener or TVS diode 100A. The Zener or TVS diode 100A may have a response time of less than 8 microseconds. The peak-to-peak voltage produced between the pair of electrodes 133 and 134 connected to the secondary winding terminals of the Flyback transformer 131 corresponds to the pulse width of the drive pulses, and hence to the stimulus level selected by push-button switches 113 of the remote transmitter 111.

When a Flyback signal is produced on the primary winding 131A of the Flyback transformer 131, the Zener or TVS diode 100A suppresses the voltage to the primary side. On the primary side, when a signal occurs at the collector of the switch transistor 130, the diode 102A biases the primary winding 131A of the Flyback transformer 131 thereby allowing the Flyback transformer 131 to be energized to the proper level for signal delivery to a load and preventing minimal, if any, current flow through the Zener diode 100A. When the transistor 130 is switched "OFF", the Zener diode 100A charges, thereby delivering the "Flyback signal" across the transformer 131 at an acceptable voltage. The voltage suppression effectuated by the Zener diode 100A that occurs on the primary side corresponds to an open-circuit peak voltage suppression level.

Figure 5:
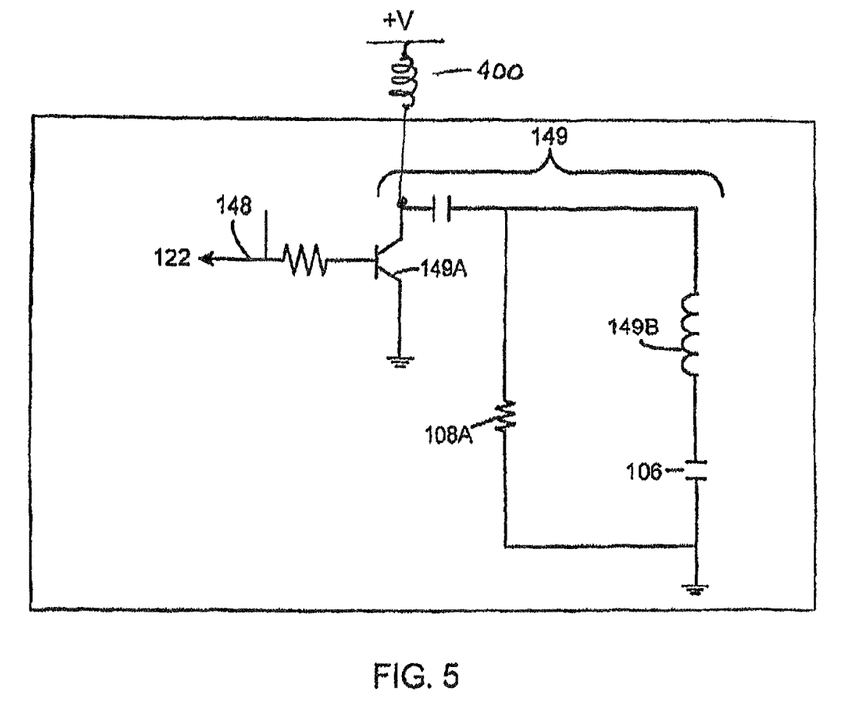
FIG. 5 is a circuit diagram of an element of the remote animal training system of FIG. 3, in accordance with the second exemplary embodiment of the present invention.

FIG. 5 is a circuit diagram of an element of the remote animal training system 110A of FIG. 3, in accordance with the second exemplary embodiment of the present invention. The microprocessor 122 (shown in FIG. 4) provides a digital signal via conductor 148 to an encoded magnetic signal generator circuit 149. Using a magnetic signal is beneficial in that it is easy to comply with FCC regulations, but those having ordinary skill in the art will recognize other types of signal generators may be relied upon for the same purpose described herein. The encoded magnetic signal generator circuit 149 includes an encoder transistor 149A with a base connected to conductor 148, an emitter connected to ground, and a collector connected to one terminal of an inductor 400. The other terminal of the inductor 400 is connected to a voltage source +V. This inductor in relation with transistor 149A, produces a "boosted" LF signal. Capacitor 106 resonates at the LF frequency 125 KHz to produce the magnetic coupling signal. The inductor 149B may have a value of, for example, 9 mH; and the capacitor 106 may have a value of, for example, 150 pF. The capacitor 106 tunes an emitter signal 150 emitted from the inductor 149B. Using the exemplary values above, the equation:

$$f_o = [2\pi\sqrt{(LC)}]^{-1}$$

where $f_o$ denotes the resonance frequency, the frequency of the emitter signal 150 generated by the encoded magnetic signal generator circuit 149 is around 125 kHz. However, the inductor 149B and the capacitor 106 values may be designed above 125 kHz to compensate for some other non-ideal effects in the encoded magnetic signal generator circuit 149.

Figure 6A:
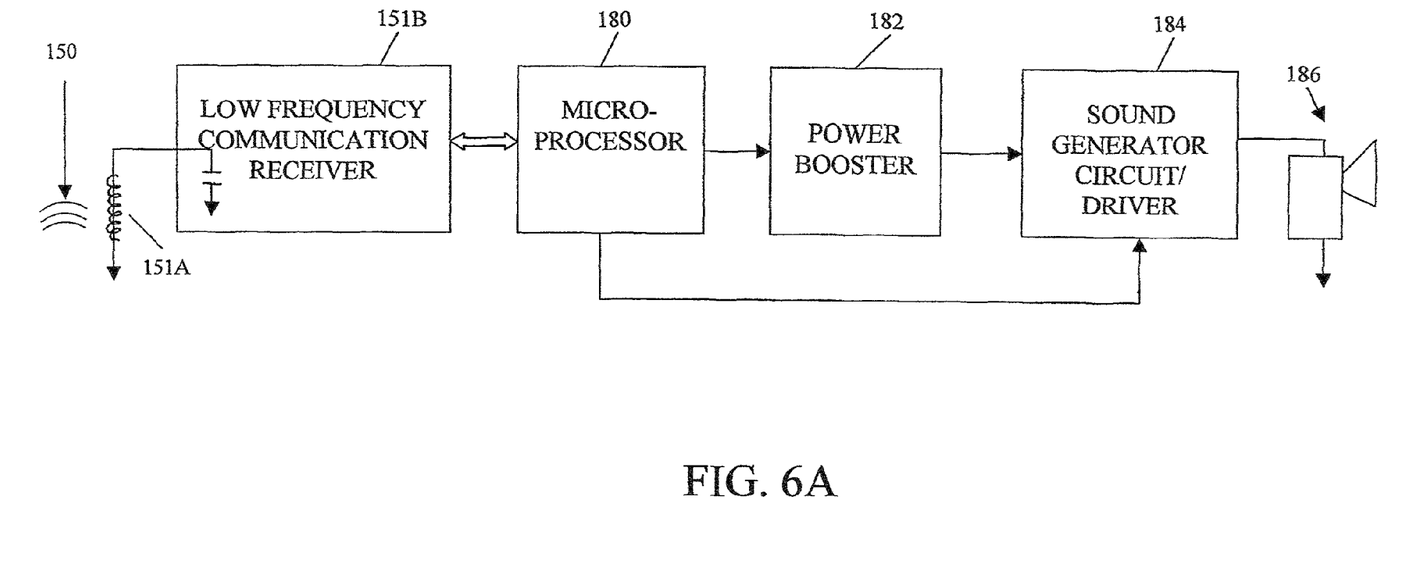
FIGS. 6A and 6B are block diagrams of accessory devices for the remote animal training system of FIG. 3, in accordance with second and third exemplary embodiments of the present invention.
Figure 6B:
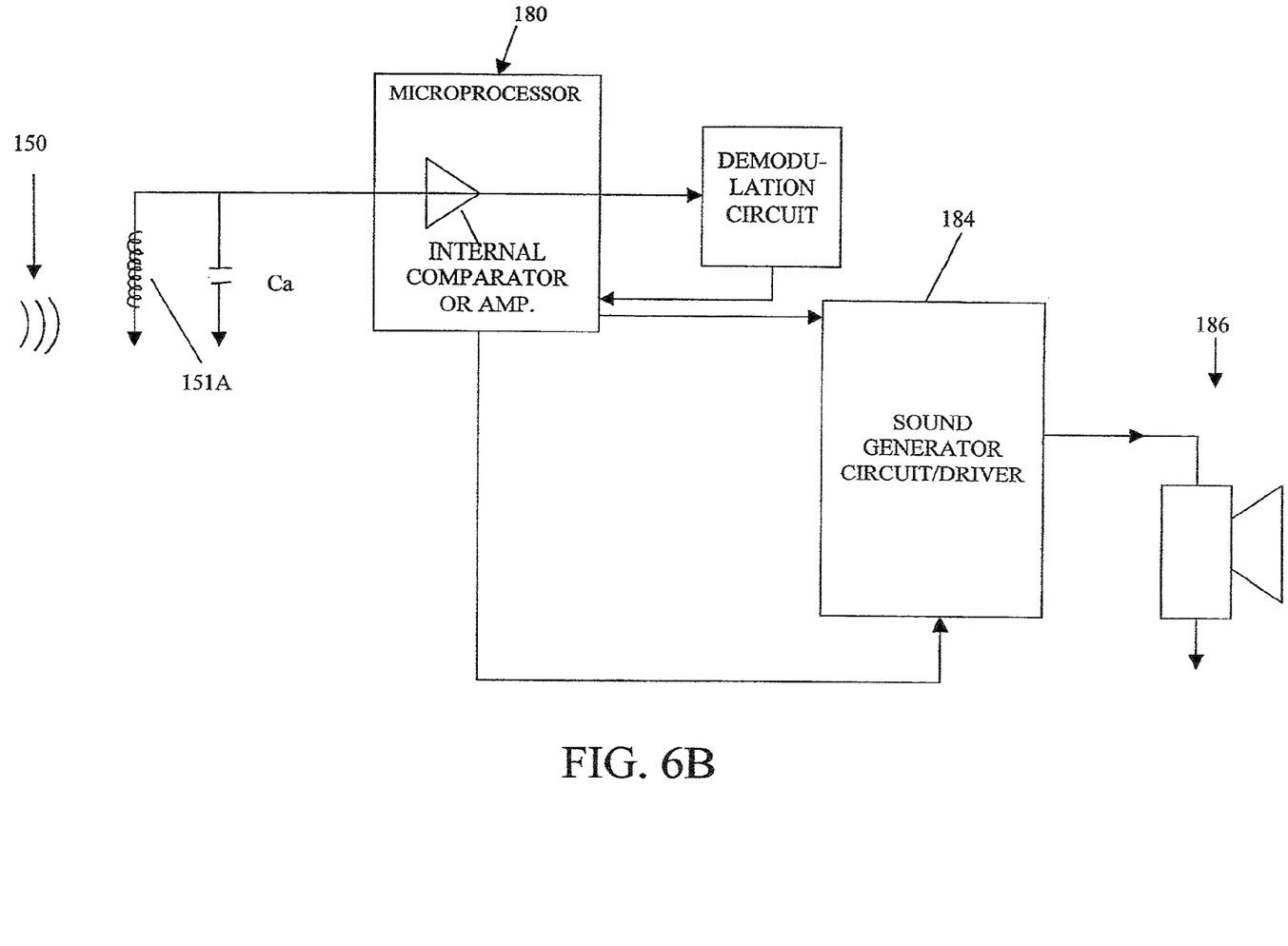

FIG. 6A is a block diagram of an accessory device 151 for the remote animal training system 110A of FIG. 3, in accordance with the second exemplary embodiment of the present invention. The accessory device 151 includes an accessory inductor 151A receiving the emitter signal 150 from the encoded magnetic signal generator circuit 149 (shown in FIG. 5). The accessory inductor 151A is connected to a low frequency communication receiver 151B which in a preferred embodiment is incorporated into an accessory microprocessor 180 (FIG. 6B). Alternatively, the low frequency communication receiver, (ATMEL ATA 5283), 151B may be separate from the accessory microprocessor 180. The accessory microprocessor 180 controls a sound generation circuit 184, a power booster circuit 182, and wake/sleep/reset functions of the low frequency communication receiver 151B. The power booster circuit 182 amplifies a signal from the accessory microprocessor 180 and is connected to the sound generation circuit/driver 184. The sound generation circuit/driver 184 is connected to a piezo-electric transducer or other sound emitting device 186.

Figure 7:
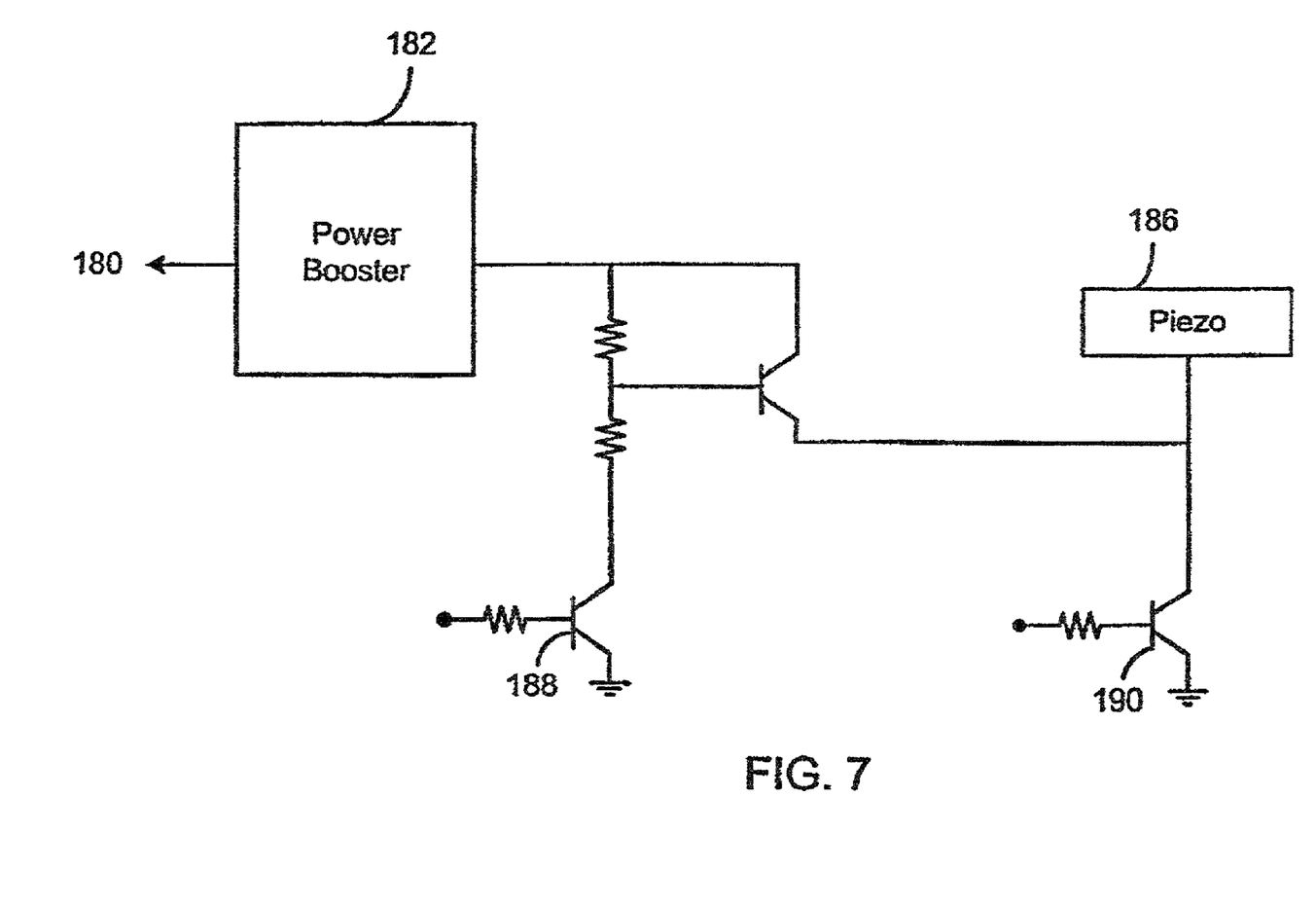
FIG. 7 is a block diagram of a portion of the accessory device for the remote animal training system of FIG. 3, in accordance with the second exemplary embodiment of the present invention.

FIG. 7 is a block diagram of a portion of the accessory device 151 for the remote animal training system 110A of FIG. 3 and FIG. 6, in accordance with the second exemplary embodiment of the present invention. The sound generation circuit 184 includes first sound transistor 188 and second sound transistor 190 controlled by the accessory microprocessor 180 (speaker and/speaker signals). The sound transistors 188, 190 power the piezo-electric transducer 186 in a push/pull configuration. Alternatively, the sound generation circuit may comprise a 1-2 watt audio amplifier driving an 8-16 ohm speaker.

Figure 8:
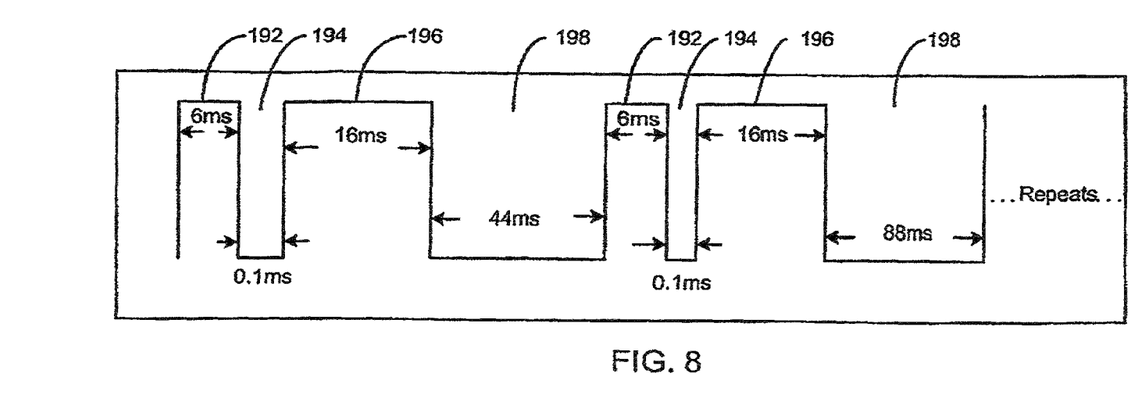
FIG. 8 is an illustration of an emitter signal for the accessory device for the remote animal training system of FIG. 3, in accordance with the second exemplary embodiment of the present invention.

FIG. 8 is an illustration of an emitter signal 150 for the accessory device 151 for the remote animal training system 110A of FIG. 3 and FIG. 6, in accordance with the second exemplary embodiment of the present invention. The emitter signal 150 produced by the encoded magnetic signal generator circuit 149 is a square wave. The emitter signal 150 is initially primed with a preamble signal 192 that contains an initial preamble 125 kHz square wave that lasts for 6 ms. When a signal of this time duration or greater is initially detected, the accessory device 151 prepares to receive more data from the corresponding transmission. There is a 0.1 to 0.5 ms of gap time 194 right after the preamble signal 192. After that, the encoded magnetic signal generator circuit 149 sends out the first sequence of data 196 with "0"s and "1"s for 16 ms duration followed by 44 ms of wait time 198. The data sequence then repeats with another 6 ms preamble, followed by 0.1 ms of wait time and a second sequence of "0"s and "1"s. This second sequence of "0"s and "1"s is actually the sequence processed by the accessory device 151. The second sequence of "0"s and "1"s is followed by 88 ms of wait time 198 before the sequence is repeated.

Figure 9:
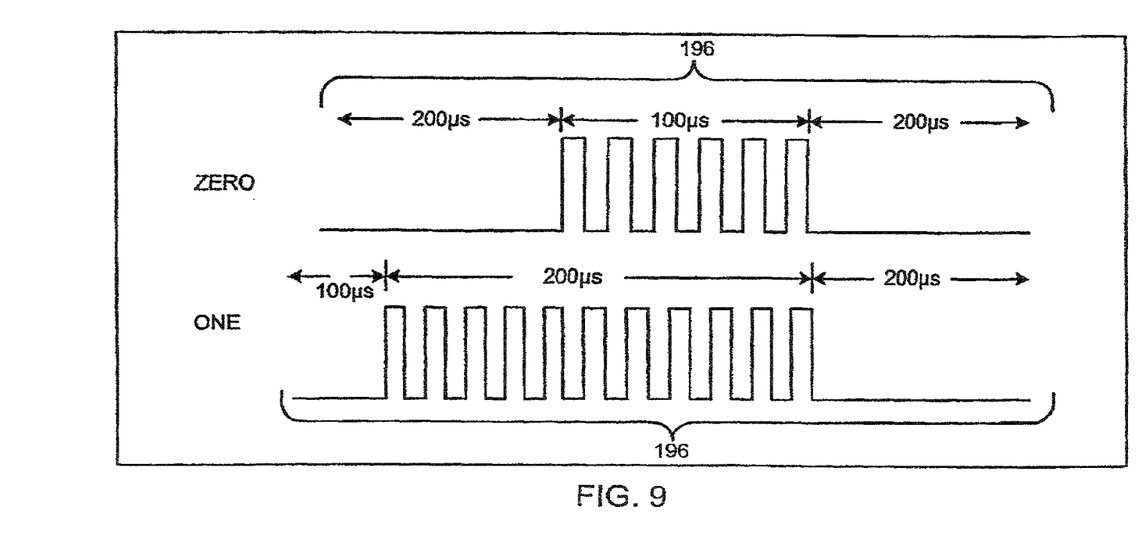
FIG. 9 is an illustration of a portion of the emitter signal of FIG. 8 for the remote animal training system of FIG. 3, in accordance with the second exemplary embodiment of the present invention.

FIG. 9 is an example of one type of an LF communication signal, and illustrates a portion of the emitter signal 150 of FIG. 8 for the remote animal training system 110A of FIG. 3, in accordance with the second exemplary embodiment of the present invention. FIG. 9 is operative for explaining the sequence of data 196 shown in FIG. 8. As shown in FIG. 9, a "0" is represented by a 0.2 ms long flat line, followed by a 0.1 ms long 125 kHz square wave, and ended with a 0.2 ms long flat line. A "1" is represented by a 0.1 ms long flat line, followed by a 0.2 ms long 125 kHz of square wave, and ended by a 0.2 ms long flat line. Hence, each data bit, whether a "1" or a "0" is 0.5 ms long. There are a total of 32 bits (16 ms of 0.5 ms bits) in the data sequence 196 (4 bits for MSB, 4 bits for LSB, 4 bits for FUNCTION and 4 bits for CHKSUM). Thus, a 16 ms data sequence 196 is transmitted.

With respect to FIG. 9, depending upon the sensitivity of the receiver and the environmental conditions relative to transmission of the emitter signal 150, it may be worthwhile to provide fewer, longer bits within the 16 ms data sequence 196 to provide a more reliable system. For instance, using a system similar to that disclosed in FIG. 9, a total of 8 bits, each up to 2.0 ms long, may be transmitted during the 16 ms data sequence 196. Further, other patterns, e.g., ⅓-⅔ long modulations, may be available for providing a "1" or a "0" as detailed above.

Figure 10:
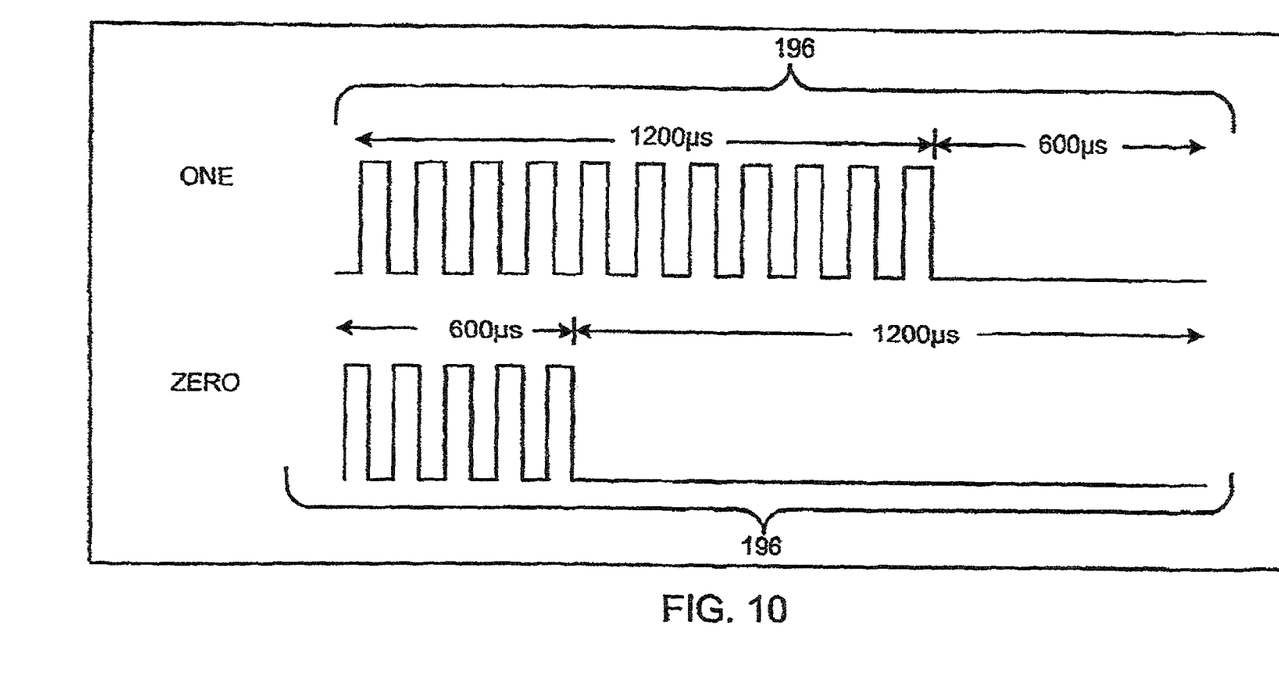
FIG. 10 is an illustration of a portion of the emitter signal of FIG. 8 for the remote animal training system of FIG. 3, in accordance with the second exemplary embodiment of the present invention.

FIG. 10 is an illustration of a portion of the emitter signal 150 of FIG. 8 for the remote animal training system 110A of FIG. 3, in accordance with the second exemplary embodiment of the present invention. FIG. 10 is one of many possible alternatives to the illustration of FIG. 9 and is operative for explaining the sequence of data 196 shown in FIG. 8. As shown in FIG. 10, a "0" is represented by a 0.6 ms long 125 kHz square wave and a 1.2 ms long flat line. A "1" is represented by a 1.2 ms long 125 kHz of square wave a 0.6 ms long flat line. Hence, each data bit, whether a "1" or a "0" is 1.8 ms long. There are a total of 8 bits (16 ms of 1.8 ms bits, with 1.6 ms to spare) in the data sequence 196. Thus, a 16 ms data sequence 196 capable of 256 different commands (2⁸) is transmitted.

The emitter signal 150 represents a command the LF receiver (up to 256 commands are possible). Typically, no addressing is required because of the short range of the Magnetic coupling. Commands would appear as addresses for accessory units that only are capable of activating only one response to a command. For example, an accessory unit that only produces an electrical stimulation of a specific intensity level (specific frequency and Vrms value) when it sees the specific command, will not respond to any other command, therefore, the command also appears as an address. There might be accessory units that respond to multiple commands but only when the specific (1 of the 3) 8-bit command is decoded. Other accessory units will respond to a specific command that will activate one of several hardware selected (switch) outputs of the unit. While accessory device 151 is on, it operates in a mode selected by internal DIP switches (not shown). In one selectable mode, if the accessory device 151 is a beeper, two different beeping patterns correspond to two different dogs. In another selectable mode, beeping sounds are emitted only when a motion detector within the accessory device 151 detects motion by the dog. In another selectable mode, beeping occurs only when the dog is motionless. The accessory unit also could comprise a strobe, vibration or electric stimulation device.

Figure 11:
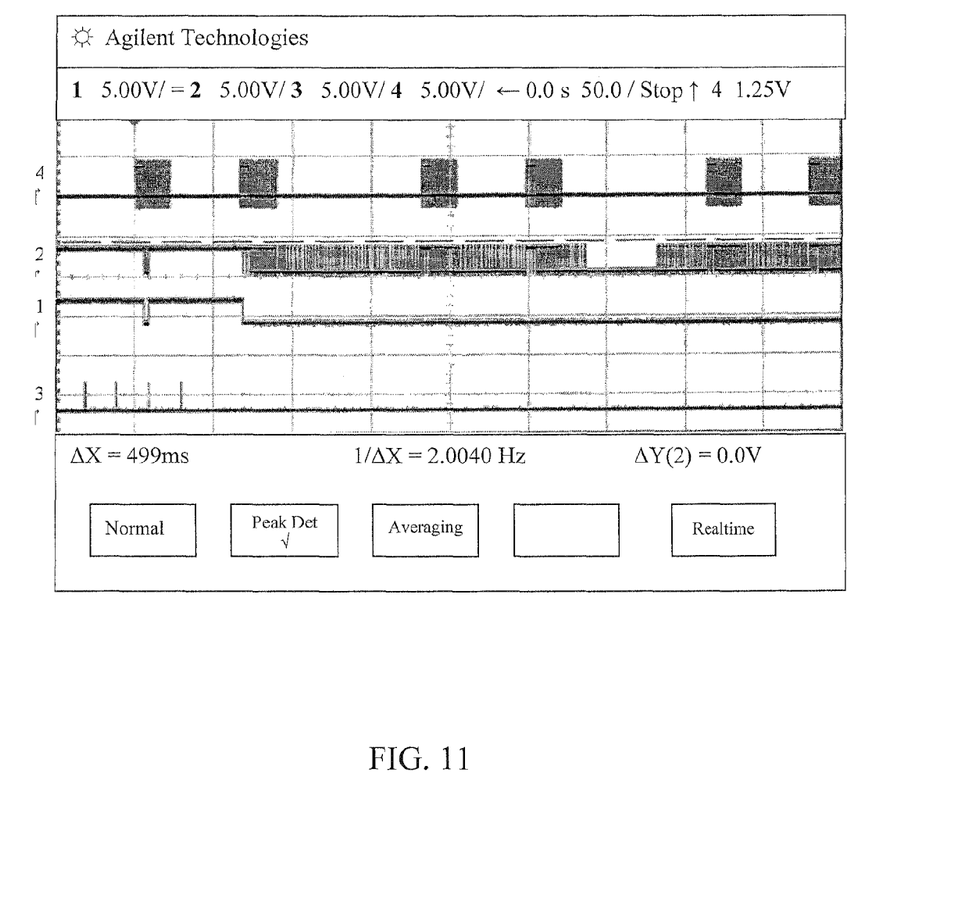
FIG. 11 illustrates actual captured signal in accordance with a second exemplary embodiment of the present invention.

FIG. 11 illustrates actual captured signal in accordance with a second exemplary embodiment of the present invention.

An LF Comm Transmitter will automatically transmit a minimum of 4 packets of data with a button press from the remote transmitter. The data is modulated at 125 kHz. Detection of 2 valid packets will activate or deactivate the accessory unit. The decoding of packet data is performed by a microprocessor interfaced to the LF Comm receiver chip by 3 lines (UPLND_DATA, UPLND_WAKE, and UPLND_RST (reset)). Activation (or deactivation) requires a minimum of 2 falling edge signals (from VCC to Ground) on the UPLND_WAKE line into the microprocessor within 100 ms of each other. The LF Comm receiver will output a low on the UPLND_WAKE line when a preamble is detected (minimum 5.64 ms Preamble duration) through the receiver antenna input. FIG. 11 illustrates the activation of the accessory function.

As seen in the FIG. 11, the UPLND_WAKE line is normally high until a preamble is detected. Once the first packet is detected, The microprocessor will reset the LF Comm receiver chip by pulsing the RESET line (Bottom Signal-CH3). If a second preamble signal is detected within 100 ms of the first, the UPLND_WAKE will again go low and the microprocessor will activate the accessory function (or deactivate). After the second preamble detection, data will be available at the UPLND_DATA (second signal from top-CH2) line for command decoding. If a second falling edge signal at the UPLND_WAKE line within 100 ms of the first, the accessory function will fail to activate (or deactivate) and the activation process will be reset and 2 more valid preamble signals will be expected to activate or deactivate the accessory function of the accessory unit.

When the inductor 149B is set at 1.08 mH and the capacitor 106 is set at 1500 pF, different waveforms are observed on UPLND_DATA, UPLND_WAKE and the Reset pin of chip 500 of the accessory device 151. The nominal resonance frequency is calculated to be 125.04 kHz. The overall waveforms are similar to those above in terms of switching behaviors and amount of detected noise during beeping. The noticeable difference between the two designs is the number of packets needed for the wake-up signal to respond (during both turning-on and turning-off transitions). Similar types of data have been obtained when the inductor 149B is changed to 0.37 mH and the capacitor 106 is changed to 3900 pF to give a resonance frequency of 132.49 kHz.

Apart from that, the voltage waveforms corresponding to the shared node among the capacitor 106, the inductor 149B and the resistor 108A in FIG. 4 are also plotted for the different inductor and capacitor values described above. The significant difference can be seen when the inductor 149B is 0.37 mH. When the inductor 149B is set at 9 mH or 1.08 mH, the peak voltage stays rather consistent at about 57V during oscillation. However, when the inductor 149B is set at 0.37 mH, the oscillation peaks at 53V but drops to 36V after approximately 35 µs.

Figure 12:
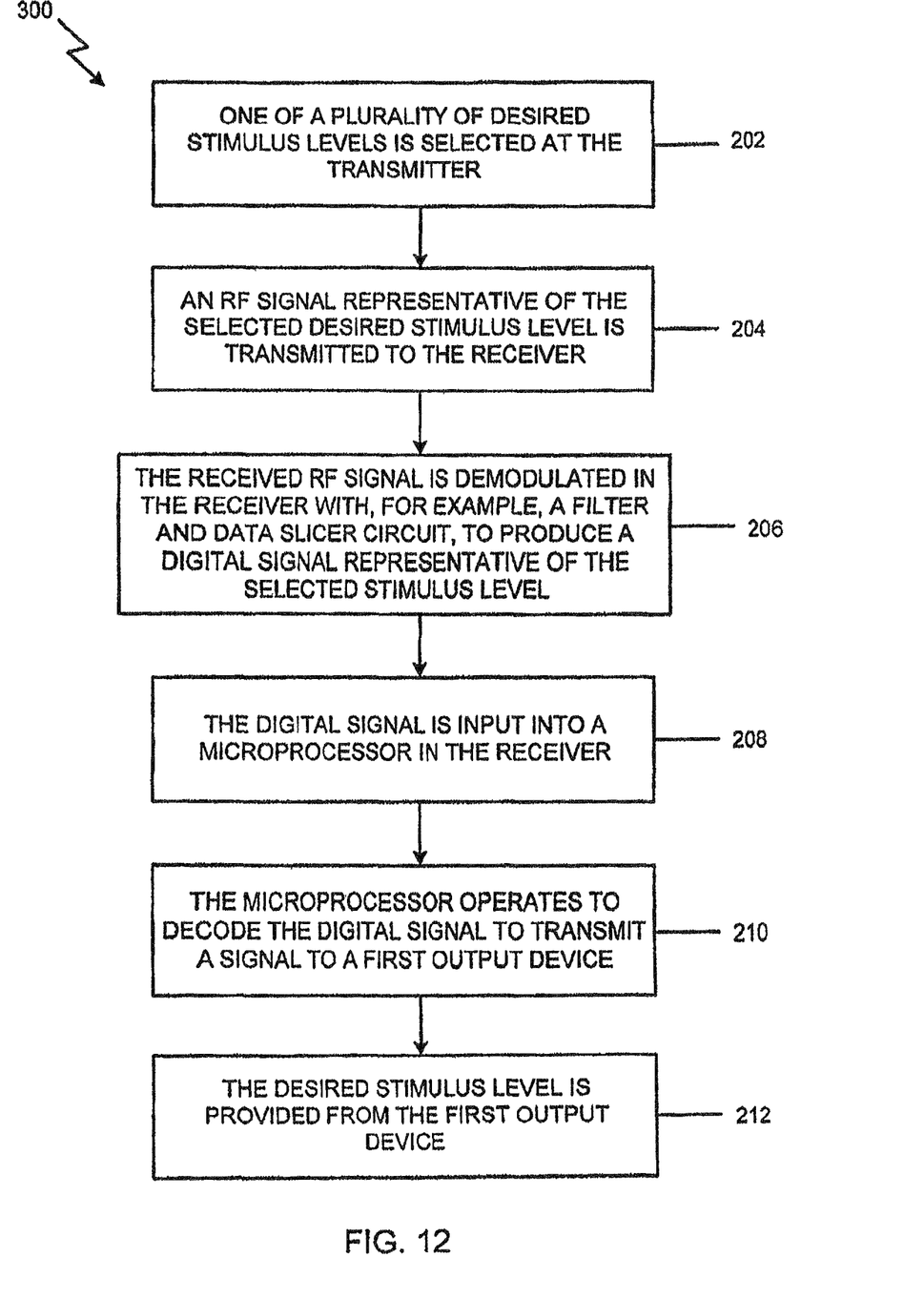
FIG. 12 is a flowchart of a method of providing the above-mentioned remote animal training system in accordance with the second exemplary embodiment of the invention.

FIG. 12 is a flowchart 300 illustrating a method of providing the above mentioned remote animal training system 110A in accordance with the second exemplary embodiment of the invention. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 202, one of a plurality of desired stimulus levels is selected at the transmitter. An RF signal representative of the selected desired stimulus level is transmitted to the receiver (block 204); The received RF signal is demodulated in the receiver with, for example, a filter and data slicer circuit 120, to produce a digital signal representative of the selected stimulus level (block 206). The digital signal is input into a microprocessor in the receiver (block 208). The microprocessor operates to decode the digital signal to transmit a signal to a first output device (block 210). The desired stimulus level is provided from the first output device (block 212).

While the above description relates to a beeper type of accessory device, it should generally be understood that this circuit is generally applicable to accessory devices that include strobes (substituting, e.g., the piezo-electric transducer 186 out for an LED) or similar. The improvements over the art described in any of the embodiments above may be added or excluded in several different combinations, and no description is intended to limit this disclosure to only the combinations described herein. Similarly, signal lengths, frequencies, and amplitudes are provided for exemplary purposes only and are not intended to limit the scope of the invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. For example, the accessory unit may comprise two or more devices such as a strobe and a electric stimulation device, which may be separately addressable. Also, two or more separately addressable accessory units may be worn on a signal animal. Additionally, the accessory device may include other functionality such as GPS functionality. Still other modifications are contemplated. All such modifications and variations are intended to be included herein within the scope of this disclosure and the present invention and protected by the following claims.

We claim:

1. A system of producing a range of predetermined stimulus intensities for training an animal using a remote transmitter and a receiver carried on the animal, comprising:
   a wireless transmitter capable of transmitting a plurality of wireless signals non-concurrently, wherein each wireless signal of the plurality of wireless signals is representative of one of a plurality of predetermined stimulus levels;
   a wireless receiver capable of receiving the wireless signal from the wireless transmitter;
   a demodulator in communication with the wireless receiver, wherein demodulating the wireless signal produces a digital signal;
   a microprocessor in communication with the demodulator for receiving the digital signal from the demodulator and producing a pulse signal therefrom; and
   a first output device in communication with the microprocessor, whereby the first output device produces a stimulus of intensity relative to a characteristic of the pulse signal, wherein said first output device includes a transformer and a Zener or TVS diode.

2. The system of claim 1, wherein the first output device includes at least one of a sound generator, a strobe, a vibrator and an electrical stimulus.

3. The system of claim 1, wherein the demodulator is a filter and data slicer circuit.

4. The system of claim 1, wherein said transformer comprises a Flyback transformer and said Flyback transformer is connected in parallel with said Zener or TVS diode.

5. The system of claim 1, wherein said Zener or TVS diode is connected across a primary winding of said transformer.

6. The system of claim 1, further comprising an encoded electro-magnetic signal generator in communication with the microprocessor and in wireless communication with the first output device.

7. The system of claim 6, further comprising a packet of data wireless signal transmitted from the encoded magnetic signal generator to the first output device.

8. The system of claim 6, wherein the receiver is collar mounted on the animal.

9. The system of claim 1, wherein the transmitter and receiver are RF transmitters and receivers.

10. The system of claim 9, wherein the transmitter and receiver are RF/LF transmitters and receivers.

11. A method of producing a range of stimulus intensities for training an animal using a remote transmitter and a remote receiver, comprising:
   selecting one of a plurality of desired stimulus levels at the transmitter;
   transmitting a stimulus signal representative of the selected desired stimulus level to the receiver;
   demodulating the received stimulus signal in the receiver to produce a digital signal representative of the selected stimulus level and inputting the digital signal to a microprocessor in the receiver;
   operating the microprocessor to decode the digital signal to transmit a signal to a first output device, wherein said first output device includes a transformer and a Zener or TVS diode; and
   providing the desired stimulus level from the first output device.

12. The method of claim 11, wherein said stimulus signal is an RF or EM signal.

13. The method of claim 11, wherein said stimulus signal is an electro-magnetic signal.

14. The method of claim 11, wherein said first output device includes at least one of a beeper, a strobe, a vibrator and an electrical stimulus.

15. The method of claim 11, wherein said Zener or TVS diode is connected across a primary winding of said transformer.

16. The method of claim 11, wherein the remote receiver is carried on an animal.

17. The method of claim 11, wherein said transformer comprises a Flyback transformer and said Flyback transformer is connected in parallel with said Zener or TVS diode.

18. A system of producing a range of predetermined stimulus intensities for training an animal using a remote transmitter and a receiver carried on the animal, comprising:
   an RF transmitter capable of transmitting one or more RF signals;
   an RF receiver capable of receiving the RF signals from the RF transmitter;
   a demodulator in communication with the RF receiver, wherein demodulating the RF signal produces a digital signal;
   a microprocessor in communication with the demodulator for receiving the digital signal from the demodulator and producing one or both of a low frequency signal and a pulse signal therefrom;
   a first output device in communication with the microprocessor, whereby the first output device produces a stimulus in response to the pulse signal, wherein said first output device includes a transformer and a Zener or TVS diode; and
   a second output device in communication with the microprocessor, whereby the second output device produces a stimulus in response to the low frequency signal.

19. The system of claim 18, wherein the second output device includes a sound generator and the stimulus includes at least one sound generated by the sound generator.

20. The system of claim 18, wherein the RF receiver is collar mounted on the animal.

21. The system of claim 18, wherein the demodulator further comprises a filter and data slicer circuit.

22. The system of claim 18, wherein the low frequency signal further comprises a wireless low frequency pulse signal.

23. The system of claim 18, wherein the RF transmitter is capable of transmitting a plurality of RF signals non-concurrently, wherein each RF signal of the plurality of RF signals is representative of one of a plurality of predetermined stimulus levels; and
   the output device is capable of producing a stimulus of intensity relative to a characteristic of said predetermined stimulus levels.

* * * * *